United States Patent [19]

Strom-Olsen et al.

[11] Patent Number: 5,605,870
[45] Date of Patent: Feb. 25, 1997

[54] CERAMIC FIBERS, AND METHODS, MACHINES AND COMPOSITIONS OF MATTER FOR MAKING SAME

[75] Inventors: John O. Strom-Olsen, Montreal; Grazyna Rudkowska; Piotr Z. Rudkowski, both of Dollard-Des-Ormeaux, all of Canada

[73] Assignee: Martinex Science, Inc., Montreal, Canada

[21] Appl. No.: 242,715

[22] Filed: May 19, 1994

Related U.S. Application Data

[63] Continuation-in-part of Ser. No. 69,194, May 28, 1993, abandoned.

[51] Int. Cl.$^6$ ................................................ C04B 35/06
[52] U.S. Cl. ................................................ 501/95; 501/35
[58] Field of Search ........................................ 501/35, 95

[56] References Cited

U.S. PATENT DOCUMENTS

| | | | |
|---|---|---|---|
| 3,720,741 | 3/1973 | Cunningham et al. | 501/95 |
| 3,780,153 | 12/1973 | Privott, Jr. et al. | 501/95 |
| 3,871,439 | 3/1975 | Maringer et al. | 164/87 |
| 3,881,945 | 5/1975 | Trojer et al. | 501/95 |
| 3,904,344 | 9/1975 | Maringer et al. | 425/422 |
| 4,757,036 | 7/1988 | Kaar | 501/95 |
| 4,970,194 | 11/1990 | Schwartzkopf et al. | 505/1 |
| 5,003,291 | 3/1991 | Strom-Olsen et al. | 340/551 |
| 5,015,992 | 5/1991 | Strom-Olsen et al. | 340/551 |
| 5,015,993 | 5/1991 | Strom-Olsen et al. | 340/551 |
| 5,027,886 | 7/1991 | Strom-Olsen et al. | 164/463 |

FOREIGN PATENT DOCUMENTS

WO88/7979  10/1988  WIPO .

OTHER PUBLICATIONS

*Materials Science and Engineering*, A 133 (1991), pp. 158–161, *The fabrication of fine metallic fibers by continuous melt–extraction and their magnetic and mechanical properties*, P. Rudkowski, G. Rudkowska and J. O. Strom–Olsen of McGill University (Canada) no month.

*J. Appl. Phys.* 69(8), Apr. 15, 1991, pp. 5017–5019, *The magnetic properties of sub–20–μm metallic fibers formed by continuous melt extraction*, P. Rudkowski, G. Rudkowska and J. O. Strom–Olsen of McGill University (Canada) and C. Zeller and R. Cordery of Pitney Bowes (Connecticut).

*Journal of Magnetism and Magnetic Materials* 114 (1992) MMM01436 North–Holland, pp. 1–11, *Microstructure studies of melt–extracted Nd–Fe–B fibers*, A. Zaluska, Z. Altounian and J. O. Strom–Olsen of McGill University (Canada) no month.

*IEEE Transactions on Magnetics*, vol. 28, No. 4, Jul. 1992, pp. 1899–1903, *The Properties of Sub–20–Micron Permalloy Fiber Formed by Melt Extraction*, P. Rudkowski, G. Rudkowska, A. Zalusla and J. O. Strom–Olsen of McGill University (research supported by Pitney Bowes and Monarch Marking).

*J. Mater. Res.*, vol. 7, No. 9, Sep. 1992, pp. 2365–2372, *Bi–based high $T_c$ superconducing fibers by melt extraction*, J. J. Chang, G. Rudkowska, A. Zaluska, P. Rudkowski and J. O. Strom–Olsen of McGill University (Canada) and J. Cave of Institut de Rechershe d'Hydro Quebec (Canada).

Chang et al, "Bi–based High $T_c$ superconducting fibers by melt extraction", *J. Mater. Res.*, vol. 7, No. 9, Sep. 1992, pp. 2365–2372.

*Primary Examiner*—Melissa Bonner
*Attorney, Agent, or Firm*—Wolf, Greenfield & Sacks, P.C.

[57] ABSTRACT

A free formed ceramic filament has a small, uniform diameter throughout and is substantially 100% dense, made from a material which exhibits a viscosity of less than 10 poise and has a physical structure that is partially amorphous with the balance, made up of complex crystals which are less than about 5 microns or substantially made up of complex crystals which are less than substantially 5 microns and has an outer surface which is substantially smooth throughout, except for a substantially linear matt surfaced line, which extends longitudinally along the outer surface of the filament.

10 Claims, 3 Drawing Sheets

Fig. 5.

CERAMIC FIBERS, AND METHODS, MACHINES AND COMPOSITIONS OF MATTER FOR MAKING SAME

RELATED APPLICATION

This application is a continuation in part of U.S. patent application Ser. No. 08/069,194 filed May 28, 1993, now abandoned, entitled Ceramic Fibers and Methods, Machines and Composition of Matter for Making Same which is incorporated by reference herein.

BACKGROUND OF INVENTION

This invention relates to the field of ceramic fibers and other types of ceramic filaments, and to machines, methods and compositions of matter for making same.

Ceramic filaments and fibers are of current interest for a number of different applications, including the reinforcement of structural members made from a variety of materials, filtration media, fiber optic structures, etc. However, primarily because of their inherent characteristics, ceramic materials of low viscosity when melted have not been susceptible to being rendered into high strength long fibers or filaments (i.e., having large length to diameter ratios) of substantially round, uniform, and small diameter throughout, with smooth outer surfaces. This is in contrast with known techniques for making metal fibers which have proven to be more successful.

Thus, it is known to make metal fibers by a number of different methods and apparatus. For example, it is known that metals may be cast into water to form redraw stock which may then be drawn down to finished size, and to draw liquid metal contained in a pyrex tube. It is also known to use the so-called "pendant drop" approach in which drops of molten metal are dropped onto the rim of a revolving wheel. Other approaches include the so-called "melt extraction" techniques which generally are directed to the concept of using a revolving wheel to remove a continuum from the top surface of a source of molten metal. In connection with the foregoing approaches, reference is made to the following: Maringer et al U.S. Pat. No. 3,871,439; Strom-Olsen et al U.S. Pat. Nos. 5,027,886, 5,003,291, 5,015,992, and 5,015,993; *Materials Science and Engineering*, A133 (1991) 158–61; *Journal of Applied Physical*, 69 (8), 15 April 1991, 5017–19; *Journal of Magnetism and Magnetic Materials*, 114 (1992) MMM01436, 1–10; *IEEE Transactions on Magnetics*, Vol. 28, No. 4, July 1992, 1899–1993; and *Journal of Materials Research*, Vol. 7, No. 9, September 1992, 2365–72; and the references cited in the foregoing.

While acceptable in many regards for the production of metallic continuums, none of these approaches has proven applicable, or even transferable, to the production of continuums of ceramic, particularly when made from ceramics which are of low viscosity when melted, in the form of long, smooth surfaced fibers or filaments of substantially round, uniform, and small diameter throughout. There are several reasons for this. Among them are that ceramics inherently do not wet non-ceramic surfaces readily and because ceramics lack good thermal conductivity, anything analogous to the extractor wheel used in melt extraction techniques usually are made from non-ceramic materials. Ceramics exhibit viscosities when molten that are too low to permit formation into fibers or filaments by drawing techniques but are too high for them to be formed by melt extraction techniques. Further, they are not susceptible to being rendered molten by such heating techniques as induction or RF heating, and are not reactive, even in the molten state, to electromagnetic fields.

For those and other technical reasons, different kinds of approaches have had to be used in attempting to produce ceramic fibers. In one approach, ceramic is suspended in a gel which is then extruded or otherwise formed into a desired shape which then is heat treated to drive off the non-ceramic constituents and to cause the ceramic to fuse by sintering. In another approach, "grown" fibers of quartz, for example, are drawn through a hot quartz bull block. Another method is to vapor deposit ceramic, such as silicon carbide, onto a base filament, such as a carbon thread. Characteristically, all of these approaches are costly and time consuming, technically difficult to carry out, and, in the end, productive of materials which, in one respect or another, fall short of the desired constellation of quality and characteristics attributes. More specifically, they are often not productive of long filaments which are uniformly of small, round and uniform diameter with smooth surface throughout and having desired high mechanical strength. Their resulting ceramic products, even to the extent that they are, or may be used in, products which are commercially useful, are not of the desired levels of product quality and choice, and are technically and economically prohibited for most applications other than those where their shortcomings can be accommodated, their high costs justified, and no other more viable alternatives are available.

Accordingly, there is interest in easing some of production difficulties and costs that are inherent in these approaches to making ceramic fibers by eliminating some or all of the intermediate and support steps and adjunct sacrificial materials used in them. Thus, other efforts have been directed toward the direct, single step production of finished filaments having such desired characteristics. One approach is that of attempting to adapt the so-called "pendant drop melt extraction" technique to the production of ceramic fibers as disclosed in Schwartzkopf U.S. Pat. Nos. 4,970,194 and 5,053,384 wherein the raw material for the fibers is gravity-dropped onto the edge of a spinning wheel where it is "frozen". That approach purportedly is applicable to produce fibers from certain metal oxide ceramics such as super conductivity alloys. However it requires the use of an oxidizing flame as the melting heat source, and according to the teachings of those patents, it forms short fibers which vary in length from 2–4 cm. and in "diameter" from 20 to 30 micrometers which are only in some occasions circular in cross-section but in most instances are somewhat ribbonlike. In other words, their length to diameter rations are not high, they are not of small, uniform diameter or uniformly circular in cross-section, and their surfaces are not uniformly smooth.

Attempts to utilize something analogous to the previously described melt extraction technique have not been successful, either, to produce amorphous ceramic filaments with small, uniform diameters, uniformly circular cross-section, in long lengths, with smooth surfaces. In that approach, exemplified in Bosswell et al U.S. Pat. No. 5,067,554, a pool of molten material is created with the rim of a cooled, revolving disk inserted into the molten material, so that powder granules or ribbons of solidified ceramic are produced which, in addition to not being fibers or filaments, do not meet the other criteria of desired characteristics hereinbefore described.

Further, as to all of these previous attempts to produce ceramic fibers, the resulting end products are basically of crystalline structure, rather than being amorphous or of small crystals or both as may be desired for improved physical characteristics.

Accordingly, it is an object if this invention to produce ceramic fibers and other filaments.

Another object of this invention is to produce such ceramic fibers and other filaments that are characterized by being of small diameter.

Yet another object of this invention is to produce ceramic fibers and other filaments that meet one or more of the foregoing objectives and are characterized by being of substantially uniform diameter.

Still another object of this invention is to produce ceramic fibers and other filaments that meet one or more of the foregoing objectives and are characterized by being in long lengths, i.e., are of large length to diameter ratio.

Another object of this invention is to produce ceramic fibers and other filaments that meet one or more of the foregoing objectives and are characterized by having surfaces which are substantially entirely smooth.

Yet another object of this invention is to produce ceramic fibers and other filaments that meet one or more of the foregoing objectives and are characterized by being of substantially uniform circular cross-section.

Still another object of this invention is to produce ceramic fibers and other filaments that meet one or more of the foregoing objectives and are characterized by being of amorphous structure, at least in part.

Another object of this invention is to produce ceramic fibers and other filaments that meet one or more of the foregoing objectives and are characterized by having surfaces which are characterized by their great flexibility.

Yet another object of this invention is to produce ceramic fibers and other filaments that meet one or more of the foregoing objectives and are characterized by having been free-formed.

Still another object of this invention is to produce ceramic fibers and other filaments that meet one or more of the foregoing objectives and are characterized by being high strength.

Another object of this invention is to produce ceramic fibers and other filaments that meet one or more of the foregoing objectives and are characterized by being of small crystalline structure, at least in part.

Still another object of this invention is to provide methods to produce ceramic fibers and other filaments that meet one or more of the foregoing objectives.

Yet another object of this invention is to provide apparatus to produce ceramic fibers and other filaments that meet one or more of the foregoing objectives.

Another object of this invention is to provide compositions of matter to produce ceramic fibers and other filaments that meet one or more of the foregoing objectives.

STATEMENT OF INVENTION

Desired objectives may be achieved through practice of this invention for making ceramic fibers and filaments that are very fine, comparatively long, substantially uniform in diameter and roundness, and of varying desired degrees of amorphousness and crystallinity, which utilizes as a feed stock source, ceramic material of desired characteristics in the end product and in carrying out this invention, that has been rendered into a molten apex of small horizontal cross-section, as by locally heating the tip of a thin ceramic rod, or by inducing a peak on the surface of a pool of molten ceramic by mechanical induction or other transducer means such as an ultrasonic generator. A narrow moving surface of small width and adequate heat tolerance and (preferably) good thermal transmission capability, such as the peripheral edge of a rotating wheel or a very narrow, moving belt, and the top surface of the molten ceramic apex are brought just into minimal contact with each other without the moving surface significantly penetrating through the surface-tensioned top layer of the molten ceramic apex, following which the moving surface and the molten tip are backed away from each other slightly. The ceramic feed stock is designed to have particular desired characteristics. First, it is capable of causing the top surface layer of its molten apex to adhere to the moving surface, such as by wetting of the moving surface. Additionally, the ceramic feed stock is such that when it is heated to a desired temperature at which it is molten, its viscosity does not exceed a predetermined upper limit that is sufficiently low for the molten ceramic to flow readily and to be extracted it a low volume rate to enhance producing filaments of small diameter, and for its wetability to be enhanced, yet still is viscous enough to not to loose continuity or fall away as it adheres to and is carried, contact surface guided, by the moving surface. Preferable, the melt viscosity is in the range of 0.01 to 10 poises. These characteristics enable the molten ceramic material to adhere loosely to the moving surface, as a result of which, the moving surface removes ceramic material from the molten apex. A desired characteristic of the moving surface is high thermal conductivity. By that means and/or radiation and/or convective cooling of the extracted ceramic, the ceramic material adhered to the moving surface begins to solidify into a string-like strand of ceramic material which, as it quickly gets progressively cooler, forms into a continuous filament hanging by loose adhesion from the moving surface, from which it is then removed and recovered. While so cooling, the strand "free-forms" as it cools toward solidification because the surface tension of the outer surface layer of the strand causes that layer to contract and thereby to create "hoop" compression forces on the still somewhat plastic mass of ceramic which it surrounds, causing it to form into a substantially round, uniform diameter ceramic fiber or filament of great length to diameter proportion and of substantially 100% density, the outer surface of which is substantially entirely smooth, and the cross-sectional dimensions of which are kept to desired smallness by regulation of the amount of molten ceramic removed from the molten apex per unit of time.

Preferably, the ceramic fibers made in accordance with this invention are taken from the melt by a moving surface and rapidly solidified on the moving surface to solidify in no more than 0.01 second at a cooling rate of at least $1 \times 10^{4\circ}$ C. per second. The line of contact results in each fiber having a linear, preferably parallel to the fiber axis matt surface contact guide surface trace forming a noticeable line on the surface of the fiber. This line is important structurally since in many embodiments, it forms a radius with crystalline structure in the fiber cross sections varying and increasing in size with distance from the line. Often the cross section structure adjacent the line is amorphous or nanocrystalline (less than 0.1 micron width) and small then larger crystals can occur as distance from the line increases. This structure provides desirable mechanical high strength such as high tensile strength. The resulting fibers when quenched as described have gone from liquid to the solid fiber extremely quickly and have good mechanical strength often forming extremely small or nanocrystalline or amorphous physical structures substantially throughout the fiber cross section. The fibers (which are also referred to herein as strands or filaments) are preferably cooled in air on the moving surface mainly by transfer of heat to the moving surface. In some cases the atmosphere surrounding the fiber can be cooled below ambient but preferably the cooling is mainly by contact with the wheel surface. In some cases the wheel can be cooled but in most cases atmospheric cooling of the wheel at ambient temperature is sufficient.

DESCRIPTION OF DRAWINGS

This invention may be understood from the description which follows and from the accompanying drawings in which FIGS. 2A through 2C are cross-sectional side elevation views of successive stages of operation of the embodiment of this invention shown in FIG. 1, FIGS. 3A through 3C are cross-sectional front elevation views of the successive stages of operation of the embodiment of this invention shown in FIG. 1, at corresponding sequential points respectively to those shown in FIGS. 2A through 2C, FIG. 4 is a detail cross-sectional depiction of a moving surface suspended filament according to this invention at a point in production shown in FIG. 2C.

DESCRIPTION OF PREFERRED EMBODIMENTS

Figure 1:
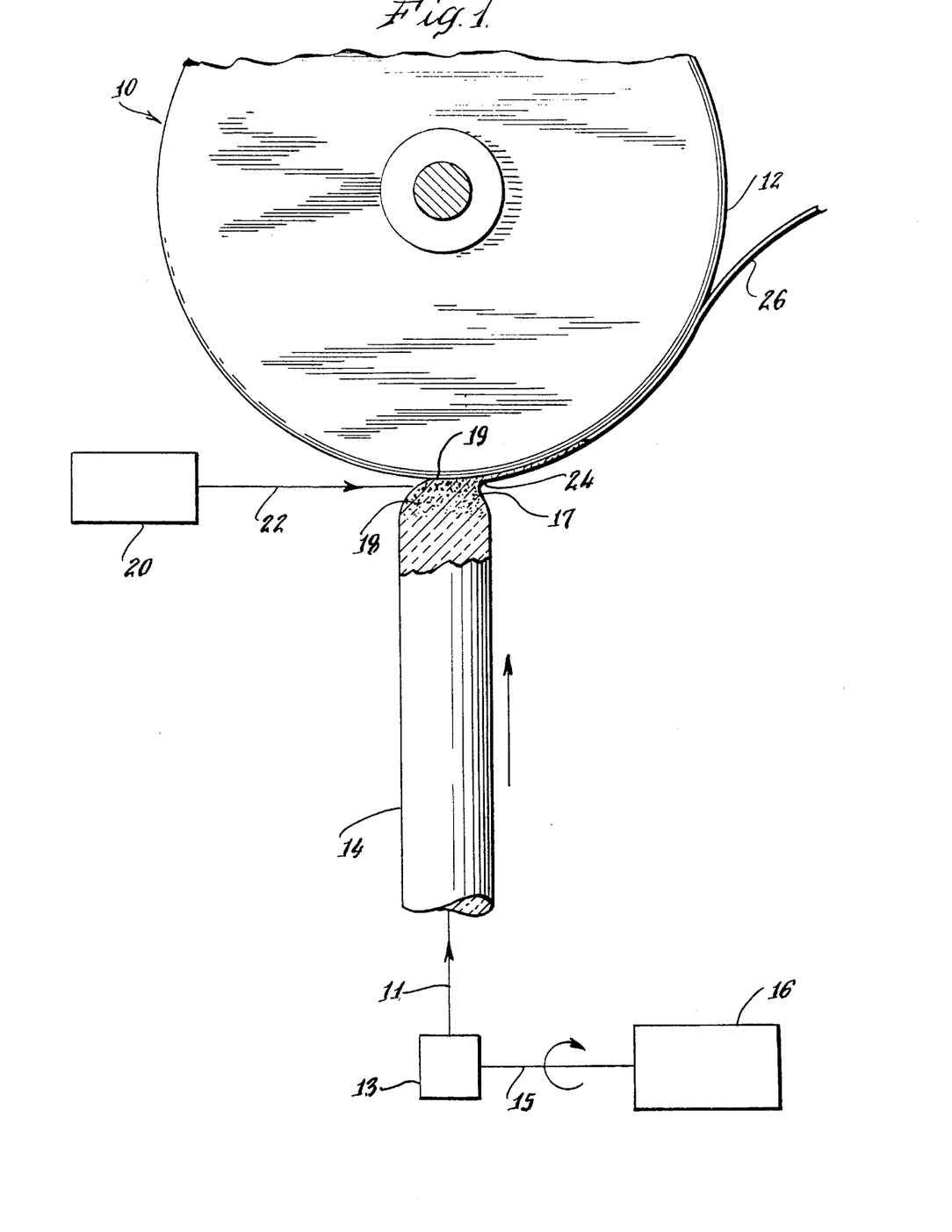
FIG. 1 is a cross-sectional side elevation view of an embodiment of this invention.

Referring first to FIG. 1, there is depicted an embodiment of this invention for making very fine, comparatively long, uniform surfaced and substantially round ceramic fibers and filaments. As is the case with other embodiments of this invention, it utilizes as a feed stock source, ceramic material of desired characteristics in the end product and in carrying out this invention. The desired characteristic of such materials in the end product are substantially dictated by the ambient conditions and requirements which obtain at the situs at which the filamentary end products are to be used and the nature of that use. Chemical and thermal stability are operative criteria, as are the strength and other physical characteristics required of such end products. These factors are within the knowledge and experience of those skilled in the cognizant arts. Thus, typically, ceramic feed stock consisting of at least one oxide of an element selected from the group consisting of Al, Zr, Ti, Si, Fe, Co, Ca, Nb, Pb, Mg, Sr, Cu, Bi, and Mn may be used, as may also specific ceramic materials such as $Al_2O_3/CaO$; $Al_2O_3/ZrO_2$; $Fe_2O_3/SrO$; and Bi—Sr—Ca—Cu oxide (high temperature super conductor). This invention is not, however, restricted to oxide ceramics, since other ceramics such as carbides, may be produced, as may also ceramics which include elements selected from the group consisting of Fe, C, Mg, F, and Si, and/or ceramics which include additions amounts of metals, such as Au and Ag, depending upon the characteristics desired in the feedstock and/or in the end product. A eutectic mixture of aluminum oxide and zirconium oxide has been found to be particularly advantageous in forming high strength fibers of this invention. Ceramics which do not melt cannot be used in this invention.

However, consideration must also be given to the characteristics of the feed stock material in carrying out this invention as a means to produce such end products. Characteristically, unlike metals, for example, ceramics when molten do not readily "wet" non-ceramic surfaces with which they come into contact. However, as will be apparent presently, one of the desired properties of the moving surfaces utilized in practicing this invention is high thermal conductivity; a characteristic which ceramics typically do not possess. For that reason such moving surfaces preferably are made from non-ceramic material. Since low viscosity is not detrimental in carrying out this invention, as is the case with the melt extraction of metals for example, particular attention may instead be directed to formulating the ceramic feed stock to have enhanced wetability properties and it may be heated to high temperatures to further enhance such wetability. While care should be exercised for obvious limitations to be observed (e.g., the moving surface hereinafter described should not to come into contact with the molten ceramic at a speed which is too high for adequate adhesion (as by wetting) to occur, these and other desired properties may be enhanced by known techniques in designing the moving surface and/or in compounding and handling the ceramic material. Accordingly, these characteristics in each embodiment are to be accurately assessed and accommodated, so that the effective operative adhesion capabilities for the exact composition of the ceramic feed stock and the moving surface are not exceeded.

As will be seen presently, it is also necessary to keep the viscosity of the molten ceramic below predetermined upper limits. In general, for a given ceramic compound, at the desired temperature(s) at which the ceramic is molten, the viscosity of the molten ceramic should be such that it will be sufficiently low for it to flow and (preferably) to wet readily, so as a practical matter, there is virtually no lower limit. At the same time, it should not be so high that the ceramic material will be "drawn" (i.e., cross-sectionally reduced in size due to the application of linear tension) as it is removed from the molten mass by the moving surface. Instead, as will be described presently, the object is to remove ceramic material from the molten apex as a linear continuum of material that is not under significant longitudinal stress, as by partially solidifying a small cross-section and withdrawing that away from the still molten ceramic material that is adjacent to it. Thus, melting of the ceramic feed stock may occur at temperatures that are in the range of 700° C. to 2400° C. or to 2600° C., with melt viscosities in the range of 0.01 to 10 usually being the preferred viscosity range. More preferably the melt viscosity is 1 poise or less and most preferably the ceramics used have a melt viscosity of 0.5 poise or less. Such ceramics ordinarily do not have sufficient mechanical strength in the melt and when drawn to enable ordinary melt spinning or drawing to be used to form long continuous high strength fibers. In fact, below about a melt viscosity of 1 poise fibers cannot be drawn from a ceramic melt since they break because they lack the tensile strength to allow drawing. The low melt viscosity contributes to making the diameter of the filament very small and uniform since mass of material that is made available to constitute the filament produced is kept small, and that is further enhanced by rendering the ceramic material into the form of a molten apex, or sharply rising summit, of very small (e.g., 1–3 mm) horizontal cross-sectional dimension or "diameter" taken at about 2 mm below the top tip of the apex.

One example of how that configuration may be achieved is illustrated in FIGS. 1 through 3C where the ceramic feed-stock is formed into a rod or shaft 14 of small cross-sectional dimensions, whether round, rectangular, triangular or any other geometric shape. Typically, the rod may be 1 to 5 mm in maximum cross-sectional dimension, depending upon such operative functional considerations as the composition of the ceramic, its melt viscosity characteristics, the speed of the moving surface, the diameter of the filament to be produced, and the nature of the heat source. Usually it will be on the order of 2 to 3 mm in diameter if round, or the functional (i.e., cross-sectional area) equivalent of that if not round. The rod, as shown particularly in FIG. 1, is oriented vertically in a feed system, such as the one shown, for automatically causing the rod to be moveable vertically upward at a regulated rate to keep the supply of molten ceramic feed stock substantially constant in terms of mass per unit time, and downward as desired in order to start the process of filament production hereinafter described. To that end, a motor or other motion source 16 may cause a drive shaft 15 to turn, actuating a worm gear 13 to produced upward and downward (as desired) vertical motion in the shaft 11 supporting the ceramic rod 14. In some cases the molten surface can be exposed to the wheel or moving surface in other than vertical arrangement, as for example, in a side to side feed to a wheel rotating on a vertical axis.

Preferably, the ceramic feedstock rod 14, so positioned and moveable, may then be rendered to have a molten apex or surface at its top tip, of desired dimensions such as those stated above. As illustrated, a non-disruptive energy source, such as the laser beam 22 generating laser generator 20, delivers sufficient energy to the tip of the rod 14 to cause it and the portion 18 immediately beneath it to become rendered molten and, give the small diameter of the rod and the surface tension in the outer layer 17 of the exposed portion of the molten portion 18., in the shape and dimensions of an apex of the type described. In this context, by a "non-disruptive" energy source is meant one which, while delivering the required energy to the tip of the rod to cause it to melt, will not, at the same time, cause the ceramic so melted to be significantly jarred or moved or otherwise disturbed physically, as might occur, for example, where a compound which is all or mostly ceramic is exposed to a flaming gas jet or where a metal bearing ceramic material is exposed to an RF field. This is of particular concern where very fine, small diameter filaments are to be produced, since the small, mass of molten ceramic presented by the small dimensioned rod 14 may be more susceptible to being disturbed physically than might be a larger mass.

Figure 5:
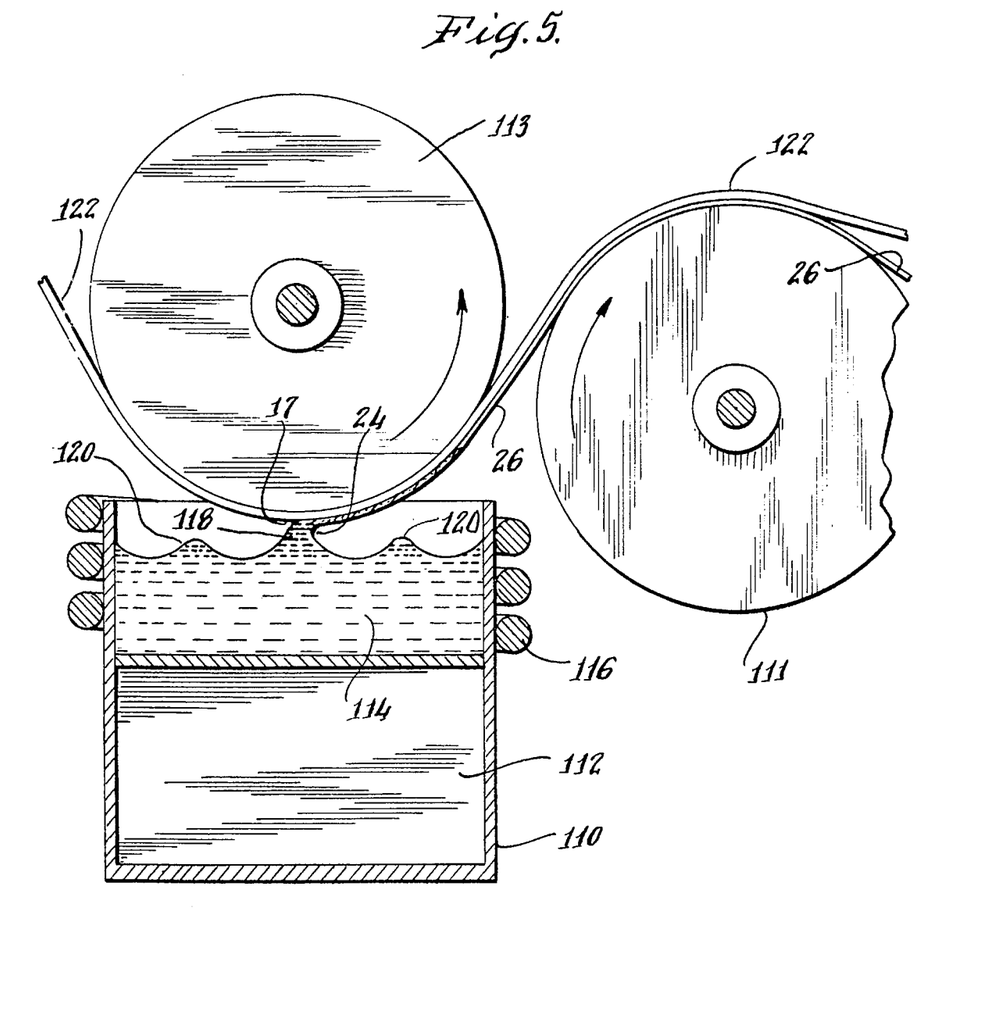
FIG. 5 is a cross-sectional side elevation view of another embodiment of this invention.

FIG. 5 illustrates other means by which this invention may be carried out. In this embodiment, a crucible 110 is provided with a heat source 112 of sufficient heating capacity to make and keep the ceramic feed-stock 114 molten. In that condition, ultrasonic, vibratory or other mechanical motion imparting means 116 is exposed to the crucible and its contents, and is so synchronized as to cause a small cross-sectionally dimensioned standing peak with an apex 118 of molten ceramic to be raised vertically from the top surface of the pool of molten ceramic 114 at a selected location, such as the middle. Typically, it may also create one or more secondary concentric ripples 120 as well, but their existence is of no moment in carrying out this arrangement. This embodiment further demonstrates the wide variety of embodiments that may be used to carry out his invention.

As shown in FIGS. 1 through 5, a narrow moving surface of small width, and adequate heat tolerance and heat transfer capability, is utilized to perform the actual formation of the desired ceramic filament. In the embodiment shown in FIGS. 1 through 3C, this narrow, moving surface is provided by the thin edge 12 of a revolving wheel 10. A function of this wheel may be to provide;heat absorption capability to remove heat from the molten ceramic with which it comes into contact and to transfer the heat away in order to cause that ceramic to begin to solidify into a strand and then a filament as hereinafter described. In that case, desired characteristics of the moving surface are for it to be made from material of high heat transfer capability and of reasonable durability to the ambient thermal, physical and chemical conditions to which it is exposed, as well (preferably) as being readily wettable. Molybdenum has proved to be a satisfactory material from which to make such a wheel for use with most ceramics, but of course, other materials might also be used, preferably of heat conducting refractory metals (e.g., chromium, tungsten or the like) which do not oxidize or otherwise degrade under the operating conditions to which they will be exposed. Silver, copper or gold wheels or moving surfaces can also be used in some cases. It is to be understood, however, that although high heat conduction capability may be desired characteristic of the moving surface (e.g., the wheel edge), it is not always essential since convection and/or radiation of heat away from the formed filament may suffice to provide adequate cooling and/or to enhance it. The moving surface (e.g., the peripheral rim of the wheel 10) is caused to turn by known per se drive means (not shown) so that the speed of the moving contact surface (i.e, in the embodiment shown in FIGS. 1–3C, the periphery of the wheel) is at the desired speed, typically in the range of 10 to 80 msec., consistent with preserving the quality and physical condition of the filament produced, adequate adhesion of the molten ceramic to the moving surface which it contacts, controlling centrifugal forces, etc.

FIG. 5 also illustrates another one of the great variety of other forms that the moving surface can take. The one therein shown is in the form of a narrow endless belt 122 or other continuum made from material which is appropriate to the circumstances of its use as outlined above, with attributes such as those described for the wheel of FIGS. 1–3, including being tolerant of its environment and use, and preferably wettable by the molten ceramic and heat transmissive. The belt 122 is positioned at its desired location vis-a-vis the molten ceramic apex 118 by means of a back-up roll 113. Either or both of the moving surface 122 and/or the molten ceramic apex 118 are moveable toward and away from each other by relative vertical movement of the back-up roll 113 and/or the crucible 110. As shown in FIG. 5, the moving surface 122 also traverses at least part of the periphery of a take-up roll 111 by which the formed ceramic filament 26 may be gathered, so that the filament is guided and retained between them. However, it is to be understood that these particular structures are merely illustrative of the wide variety of moving surfaces other than the peripheral edge of a revolving wheel may be used, and that even such surfaces as the carrier belt 122 shown may not necessarily traverse a take-up wheel 111 and/or a back-up wheel 113 as illustrated in FIG. 5. Further, the exact combinations of a wheel with a rod or an endless belt with a molten pool that have been illustrated need not be rigidly adhered to. For example, the means such as that shown in FIGS. 1 through 3C for rendering a molten apex on the ceramic feed stock may be used with any other operative moving contact surface arrangement, such as the endless belt shown in FIG. 5, and the revolving wheels of FIGS. 1–3C might be used with a vat of liquid as shown in FIG. 5. Thus, the exact nature of and means for creating the moving surface and the molten apex with which it is to be associated in any given instance is not critical to practicing this invention so long as the relationship between such elements is such that they may act in concert with each other as described.

The moving surface (e.g., the narrow peripheral edge 12 of the wheel 10 as illustrated in FIGS. 1–3C, or the narrow belt as illustrated in FIG. 5, etc.) and the top surface of the molten apex portion (i.e., 18 in FIGS. 1–3C, 118 in FIG. 5, etc.) of the ceramic feed stock source (e.g., the rod 14 in FIGS. 1–3C, the molten pool 114 in FIG. 5, etc.) are brought just into contact with each other without the moving surface interrupting the cohesive continuity of the surface-tensioned top layer of the molten ceramic apex by having significantly penetrated it. This contact is sufficient for the molten ceramic to adhere lightly to the moving surface (in this case, by wetting: the ceramic feed stock being capable of "wetting" the moving surface) throughout the region of the common interface 19 between them. The ceramic having been heated to a desired temperature at which it is molten and its wetability enhanced, has a viscosity that it is sufficiently low for it to flow readily while still providing adequate structural support and integrity for it not to fall away from the moving surface. Whether through the use of a moving surface made from material which is heat transmissive, or through the accumulation of ceramic material on the moving surface by other pick-up processes with subsequent radiation or convection cooling of the ceramic itself, the moving contact surface and the molten ceramic apex having been backed off slightly from each other, the molten ceramic adhering to the moving surface becomes cooled sufficiently for a string-like, continuous strand of ceramic material to be formed and extracted from the molten ceramic apex by the moving surface.

Figures 2A, 3B:
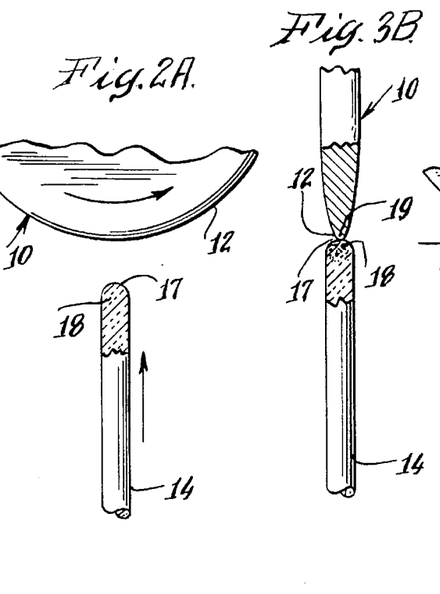
Figure 2B:
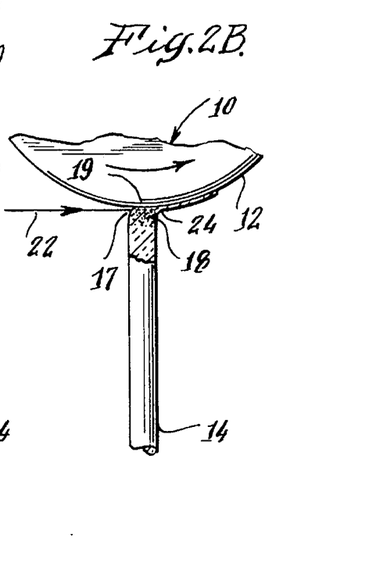
Figures 2C, 4:
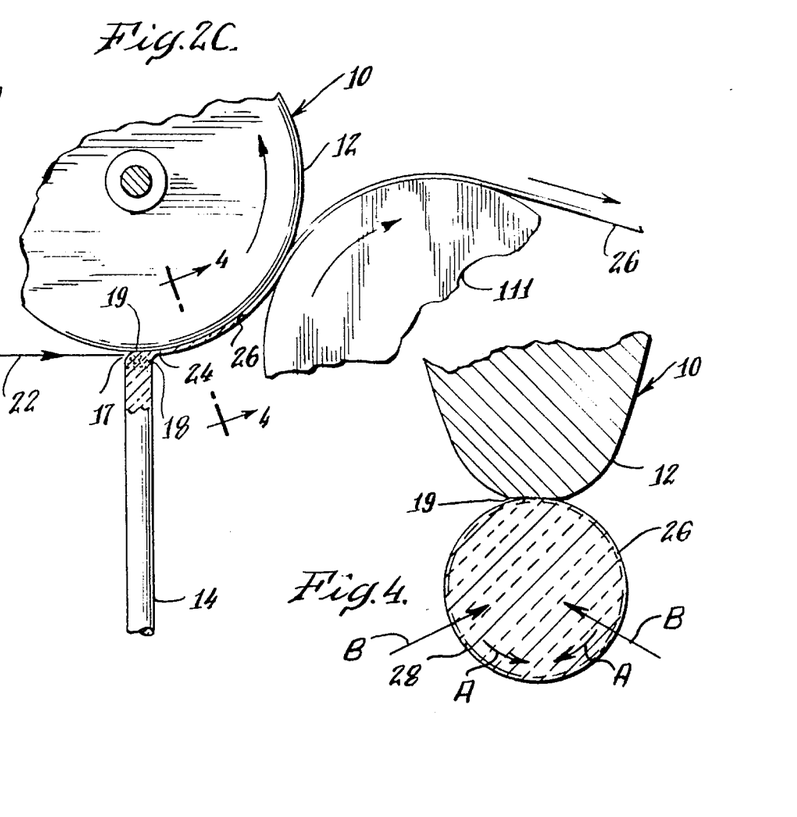

This strand formation sequence is shown in greater detail in the FIG. 4: a section taken along line 4—4 in FIG. 2C. The strand now being contact surface guided or carried along by the moving surface to which it adheres loosely and from which it hangs, cools to substantial solidification. However, before it finally does so, the core of the strand 26 is still sufficiently fluid and plastic to "free form". Therefore, simultaneously, as this cooling proceeds, the cooling-induced contraction of the outer, surface-tension cohered surface layer 28 of the strand causes that layer to shrink in the direction of the vector arrows "A", and to create "hoop" compression forces (in the direction of vector arrows "B") on the mass of still plastic ceramic which it surrounds. The result is that the contact surface guided strand 24 "freeforms" into a filament 26 or fiber which is small and substantially round and uniform in diameter throughout, of great length to diameter proportion, and the surface of which is substantially entirely smooth except normally for a minute, superficial, longitudinal, matt surfaced line on the outside surface of the filament where it was in contact with and guided by the moving surface. Subsequently, the filament so formed in gathered for further processing.

Figure 3A:
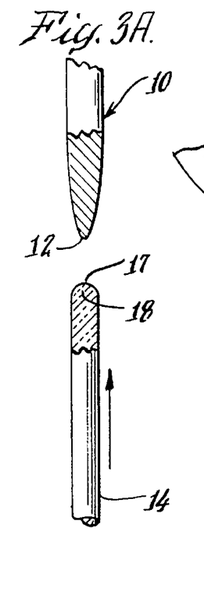
Figure 3C:
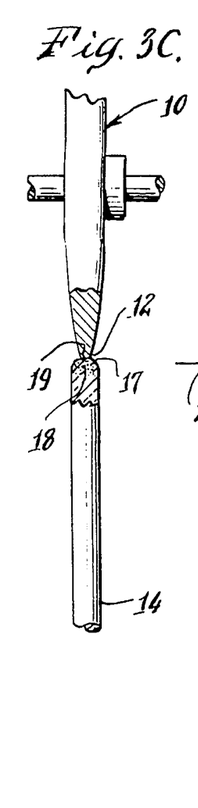

Corresponding points in this sequence are shown in side and front views respectively in FIGS. 2A through 2C, and 3A through 3C: FIGS. 2A and 3A being as the moving surface and the ceramic apex are about to be brought into contact with each other FIGS. 2B and 3B being at the point where the two contact each other, and FIGS. 2C and 3C being at the point where the two have been backed off slightly from each other, a strand 24 of ceramic has been withdrawn from the feed stock, and a ceramic filament 26 has been free-formed.

Generally ceramic fibers are formed that have maximum diameters of about 30 microns with minimum lengths of about 0.1 cm from ceramic compositions which when molten can be cast as, for example, free formed by the interacted dynamic forces of surface tension, viscosity, wetting and while under an acceleration of preferably 10 G (100 meters/seconds$^2$) to form substantially round continuous shapes of preferably more than 5 cm in length and having a contact line as previously described. The fibers when being drawn from the melt are able to transfer heat to the moving surface used to reach solidification. While some radiation occurs into the surrounding ambient atmosphere, it is not dominant and the substantial cooling occurs on the moving surface by contact. Cooling causes rapid solidification with a rate of at least $1 \times 10^{4\circ}$ C. per second in a time of no more than 0.01 seconds. The resultant fibers have a contact line which aids in structural formation of the fiber as it solidifies to result in substantial mechanical strength. The fibers have high tensile strength. As previously described, the physical structure on a radius from the line of contact starts with amorphous or small crystals and crystals gradually grow larger as one goes further from the line of contact. Thus the line of contacts becomes a structural part of the fibers formed and affects the fiber since the lines of stress are set up in the fiber radiating from the mat line of contact. While there may be many variations in this structure depending upon conditions of fiber formation, in all cases, a line of contact forms a structural member of the fibers. The moving surface allows the fiber to be formed and pulled from a tangent thereof even though the melt viscosity may be extremely low as for example, below 0.5 poises. This is quite different from other ceramic forming methods where high viscosity is necessary to keep the material in fiber form, as for example, melt viscosities above 1. The heat transfer to the wheel as opposed to any substantial radiation heat transfer is an important part of allowing fibers to be formed from low melt viscosity materials.

It is a feature of this invention that extremely low viscosity or water-like melts can be formed into fibers even if melt viscosities are substantially at 0 poises. This is so because the fibers solidify without longitudinal pulling forces exerted since the pull occurs after solidification on the wheel or moving surface involved. Other methods of forming ceramic fiber require higher melt viscosity material because of the pulling force involved on the melt where no moving surface is involved.

As is well known in the cognizant arts, the structure of the resulting filaments may be amorphous, or crystalline, or both, depending upon the composition of the raw material used, the heating and cooling sequences and times that are used, and other known per se factors. Thus, this invention is compatible with the proper manipulation of these factors and thus is capable of producing amorphous, amorphous/crystalline, and crystalline ceramic filaments which embody a wide variety of desired physical characteristics.

EXAMPLES

In apparatus of the type depicted in FIGS. I through 3C, a molybdenum wheel was used having a radius of about 10 cm and a peripheral edge radius of about 10 microns, with an effective contact surface of about 3 microns in width, was operated at a number of different peripheral edge speeds in carrying out this invention. In each case, a ceramic rod, the chemical composition of which was varied, with various diameters, was mounted vertically and its tip was heated by a CO(2) laser beam generator with a power rating of about 150 watts to a desired melting temperature at which the viscosity of the molten ceramic was in the range of 0.01 to 10 poises, forming a molten apex on the top tip of the ceramic rod. The cooling of the filament was carried out in air at ambient temperature (20° C.) in under 0.1 seconds at a cooling rate of at least $1 \times 10^{4\circ}$ C. per second varying with the speed of the wheel. The molten apex was brought into contact with the wheel and then backed off, causing the wheel to generate a continuous filament of a desired diameter which continued to be produced as the rod was advanced upward at an established rate. The operative parameters and results of 13 such examples are set forth in the following table whose weights are given as weight percent of the entire composition:

| Ex. # | Composition | Melting Temp. Deg. C. | Moving Surface Speed M/s | Rod Diam. mm | Rod Speed mm/min | Fiber Diam. um |
|---|---|---|---|---|---|---|
| 1 | 50.65% Al$_2$O$_3$ + 49.35% CaO | 1360 | 30 | 3 | .5 | 15 |
| 2 | 42% Al$_2$O$_3$ + 44% ZrO$_2$ + 14% TiO$_2$ | 1610 | 20 | 3 | .2 | 20 |
| 3 | 43% Al$_2$O$_3$ + 44% ZrO$_2$ + 13% TiO$_2$ | 1650 | 26 | 3 | .5 | 15 |
| 4 | 43% Al$_2$O$_3$ + 52% ZrO$_2$ + 5% TiO$_2$ | 1800 | 26 | 3 | .5 | 15 |
| 5 | 57.4% Al$_2$O$_3$ + 42.6% ZrO$_2$ | 1710 | 33 | 3 | .5 | 15 |
| 6 | 60% Al$_2$O$_3$ + 40% ZrO$_2$ | 1880 | 33 | 3 | .5 | 15 |
| 7 | 56% Al$_2$O$_3$ + 44% ZrO$_2$ | 1750 | 33 | 3 | .5 | 15 |
| 8 | 53% Al$_2$O$_3$ + 31% ZrO$_2$ + 16% SiO$_2$ | 1800 | 42 | 3 | 1.5 | 15 |
| 9 | 53% Al$_2$O$_3$ + 38% ZrO$_2$ + 9% SiO$_2$ | 1850 | 37 | 3 | 1.5 | 15 |
| 10 | 53% Al$_2$O$_3$ + 22% ZrO$_2$ + 25% SiO$_2$ | 1800 | 42 | 3 | 1.5 | 15 |
| 11 | 62.5% Al$_2$O$_3$ + 37.5% SiO$_2$ | 1850 | 26 | 3 | .5 | 15 |
| 12 | Ni/Zn/Fe, (Neosid, Canada) #f-29 | 900 | 20 | 5 | .5 | 10 |
| 13 | 54% Al$_2$O$_3$ 45.7% ZrO$_2$ + <.3% Y$_3$O$_3$ | 1750 | 5 | 3 | .5 | 15 |

From the foregoing, it is to be understood that filaments produced according to this invention are unique in the following combination of characteristics: (1) in structure, they are substantially entirely amorphous, or entirely crystalline, or partly amorphous with the balance crystalline, and, to the extent they are crystalline, include complex crystals which are small or very small in dimension (i.e., less than 5 microns or in the range of 1 to 30 microns in diameter); (2) they are substantially circular in cross-section and are of substantially uniform cross-section throughout and are capable of being made in relatively small diameters (i.e., generally less than about 25 microns); (3) they are substantially 100% dense; (4) when melted, they exhibit viscosities below about 10 poises and preferably below 1 poise, at which viscosities materials (ceramic or otherwise) cannot be easily drawn; and (5) they are free-formed while loosely adhering to a moving guide surface, as is evidenced by the minute linear matt surfaced line which appears on the otherwise very smooth outer surface of the filament, thus imparting to them the foregoing unique set of characteristics in addition to improved breaking strength by virtue of that smoothness of surface. In this context, by "substantially" as used herein is meant that although the state of affairs to which it refers is perhaps not literally totally so, any shortfall therefrom is of not significant material adverse effect. The term "complex crystals" means that there are a plurality of different size crystals which preferably increase in size radially outwardly of the linear matt surfaced line. Preferably the fibers have lengths of from about 0.1 centimetre P.R G.R to 1 meter or more.

It will be clear then, that through practice of this invention, ceramic filaments of small, uniform diameter, in long lengths, with smooth surfaces, in amorphous and/or crystalline form, may be produced in a wide variety of embodiments of this invention. Accordingly, it is to be understood that the embodiments herein disclosed, discussed and illustrated are by way of illustration and not of limitation, and that a wide variety of embodiments may be made without departing from the spirit or scope of this invention.

What is claimed is:

1. A free-formed ceramic filament that is small in diameter and is substantially round in cross-section and of substantially uniform diameter throughout, is substantially 100% dense, is made from material which when melted exhibits a viscosity of less than 10 poises, has a physical structure which is selected from the group consisting of 1) partially amorphous with the balance made up of complex crystals which are less than substantially 5 microns in dimension and 2) substantially made up of complex crystals which are less than substantially 5 microns, the outer surface of said filament being substantially smooth throughout except for a substantially linear matt surfaced line which extends longitudinally along said outer surface.

said crystals increasing in size radially from said linear matt surfaced line.

2. The filament described in claim 1 and further comprising said filament:

having a diameter of less than 30 microns.

a melt viscosity of mo more than 1 poise, and having been solidified in no more than 0.01 second at a cooling rate of at least $1 \times 10^{4\circ}$ C. per second.

3. The filament described in claim 2 which has a length to diameter ratio of at least 50:1.

4. The filament described in claim 3 which has a diameter of less than 25 microns.

5. The filament described in claim 1 having a melting temperature in the range of 700 to 2400 degrees C., within a selected portion of which the constituent material of said filament exhibits viscosity of no more than 0.5 poise.

6. The filament described in claim 4 having a melting temperature in the range of 700 to 2400 degrees C., within a selected portion of which the constituent material of said filament exhibits viscosity in the range of 0.01 to 10.0 poises.

7. The filament described in claim 1 having a composition which includes at least one oxide of an element selected from the group consisting of Al, Zr, Ti, Si, Fe, Co, Ca, Nb, Pb, Mg, Sr, Cu, Bi, and Mn.

8. The filament described in claim 4 having a composition which includes at least one oxide of an element selected from the group consisting of Al, Zr, Ti, Si, Fe, Co, Ca, Nb, Pb, Mg, Sr, Cu, Bi, and Mn.

9. A free-formed ceramic filament that is small in diameter and is substantially round in cross-section and of substantially uniform diameter throughout, is substantially 100% dense, is made from material which when melted exhibits a viscosity of less than 10 poises, has a physical structure which is selected from the group consisting of 1) partially amorphous with the balance made up of complex crystals which are less than substantially 5 microns in dimension and 2) substantially made up of complex crystals which are less than substantially 5 microns.

the outer surface of said filament being substantially smooth throughout except for a substantially linear matt surfaced line which extends longitudinally along said outer surface, said crystals increasing in size radially from said linear matt surfaced line, said filament, having a diameter of less than 30 microns.

a melt viscosity of no more than 1 poise, and having been solidified in no more than 0.01 second at a cooling rate of at least $1 \times 10^{4°}$ C. per second, said filament further having a composition which includes at least one oxide of an element selected from the group consisting of $Al_2O_3$, CaO, $ZrO_2$, $TiO_3$, and $SiO_2$.

10. A free-formed ceramic filament that is small in diameter and is substantially round in cross-section and of substantially uniform diameter throughout, is substantially 100% dense, is made from material which when melted exhibits a viscosity of less than 10 poises, has a physical structure which is selected from the group consisting of 1) partially amorphous with the balance made up of complex crystals which are less than substantially 5 microns in dimension and 2) substantially made up of complex crystals which are less than substantially 5 microns, the outer surface of said filament being substantially smooth throughout except for a substantially linear matt surfaced line which extends longitudinally along said outer surface.

said crystals increasing in site radially from said linear matt surfaced line, said filament, having a diameter of less than 25 microns and a length to diameter ratio of at least 50:1, a melt viscosity of no more than 1 poise, and having been solidified in no more than 0.01 second at a cooling rate of at least $1 \times 10^{4°}$ C. per second, said filament further having a composition which includes at least one oxide of an element selected from the group consisting of $Al_2O_3$, CaO, $ZrO_2$, $TiO_2$, and $SiO_2$.

* * * * *